Patented July 17, 1928.

1,677,417

UNITED STATES PATENT OFFICE.

VICTOR H. TURKINGTON, OF CALDWELL, NEW JERSEY, ASSIGNOR TO BAKELITE CORPORATION, OF NEW YORK, N. Y., A CORPORATION OF DELAWARE.

RESINOUS COMPOSITION AND PROCESS OF MAKING SAME.

No Drawing.  Application filed July 7, 1927. Serial No. 204,144.

This invention relates to the preparation of varnishes, lacquers, and similar coating or impregnating liquids, and comprises a novel varnish resin, derived from resins of the phenol-aldehyde type but differing from such resins as heretofore prepared in several important respects. My novel varnish resins are soluble in turpentine, toluene, xylene and other solvents in which the ordinary reactive resins of the phenol-methylene type are either insoluble or insufficiently soluble for varnish purposes. The varnishes so prepared dry with great rapidity as compared with commercial oil varnishes, yielding films which although elastic are very hard, and as compared with copal and similar varnishes, highly resistant to water, to weather, and to soap solutions, dilute alkalis and similar cleaning liquids.

It is known that resins of the phenol-aldehyde type may, by melting with a sufficient proportion of non-reactive natural or synthetic resins, such for example as rosin or colophony, copals, coumarin resins, esterified resins, etc., be rendered soluble to some extent in fatty oils, yielding solutions which are utilizable as varnishes. Varnishes so prepared exhibit the essential characteristics of the natural resin varnishes, modified to a greater or lesser extent by the admixed phenol-methylene resin. For example such varnishes, when applied as a film, harden by air-oxidation and therefore harden with relative slowness, as do the oil varnishes prepared with natural resins. In contradistinction to this, the varnishes embodying the present invention exhibit the essential characteristics of the phenol-aldehyde resins in that they deposit a hard film by direct evaporation of the solvent, and without dependence upon oxidation.

For the preparation of varnish resins in accordance with a preferred embodiment of the present invention, I react upon a fatty oil, preferably tung oil, with phenol or its homologs, in presence of a converting or catalytic agent, typified by phosphoric or boric acid, the reaction being so carried out that practically all of the phenol is combined with the oil. The resulting phenolic complex, of which the chemical nature is not at present definitely known, is caused to react further with a methylene-containing body as formaldehyde or paraform, and with a non-phenolic resin, the reaction being continued until the product becomes fully and permanently soluble in such varnish solvents as turpentine, toluene, xylene, or mixtures of these and other solvents and thinners commonly used in the oil-varnish art, and until it has acquired the proper viscosity for the purpose in view.

In U. S. Patent No. 1,590,079, issued June 22, 1926 to L. C. Byck is described a method for producing a reaction between phenol and a fatty oil (for instance tung oil) by means of suitable "converting agents" and then reacting on the composition so formed with methylene-containing bodies such as formaldehyde, hexamethylenetetramine, etc. to form products which are suitable as coating compositions and for many other uses. However, the products made in accordance with the above mentioned patent are of the type which must be heated after they are applied in order to finish the reaction between the phenolic body and the methylenes and obtain a hard, tough coating.

For many purposes this heating operation is objectionable or impractical and a coating must be used which will become hard when exposed to air at room temperatures or at temperatures not over 100° C. The present invention provides a means of producing such coating materials, which, though not quite so resistant to some solvents and chemicals as the baked finishes mentioned above, possess certain marked advantages over other air drying varnishes now in general use.

As set forth in the above mentioned patent, when phenol or cresol and a fatty oil such as tung oil, are heated together in the presence of a very small amount of phosphoric acid or other converting agent, a viscous fluid product is obtained which is regarded as a chemical combination of the oil with the phenol. It no longer has the characteristic odor of tung oil and it is impossible by vacuum distillation or other means to separate all the phenol from the oil, the amount of phenol which can be recovered depending on the original proportions used and on the time and degree of heating employed. For the purpose of this invention these conditions are so chosen and controlled that all or nearly all of the phenol is combined with the oil. If to this phenol-oil combination product is then added a quantity of methylene-containing substance sufficient to combine with all the phenol, together with a non-phenolic resin such, for instance, as colophony or copal, the quantity of which may be varied within wide limits, either with or without addition of alkaline or acid condensing agents, and the mixture is heated until the reaction is complete or nearly complete, a product is obtained which is clear when cold and may be either a viscous liquid or a hard tough solid, depending on the proportions of the ingredients and the time and degree of heating, and is soluble in various solvents such as turpentine, toluene, and other materials commonly used as solvents in oil varnishes. In case formaldehyde is used as the methylene containing body, it is, of course, desirable to eliminate the water by heating, either at atmospheric pressure or under vacuum. When the reaction product is made by this procedure and is dissolved in suitable solvents either with or without the addition of metallic driers, and coated onto wood, metal, fabric, paper or other material, a coating is obtained which quickly dries to a hard, tough film when exposed to air at room temperature.

The amount of methylene-containing body used should preferably be approximately the equivalent of 6 mols of formaldehyde to each 6 mols of phenol used in the preparation of the phenol-oil combination product, though amounts in excess of this quantity may be used. The amount of non-phenolic resin used may, as stated above, be varied within wide limits according to the properties desired in the finished product, though the minimum amount that has been found desirable is about 20 parts by weight to each 100 parts of phenol used in the preparation of the phenol-oil combination product and the maximum about 1500 parts to each 100 parts of phenol. The invention is not however restricted to any particular proportions.

As non-phenolic resins which are suitable for use in this type of composition the following are mentioned: Rosin, ester gum (rosin-glycerin ester) copals, elemi, coumarones, phthalic-anhydride-glycerin resins, furfural-acetone resins. In general most of the so-called "natural resins" may be used, though the proportions required with different resins must be varied somewhat to obtain the desired effects.

The following examples are given, it being understood that the proportions and conditions stated are only illustrative and may be varied acording to the particular technical effect desired. All parts are by weight:

*Example 1.*—A mixture of 100 parts of phenol, 150 parts tung oil and 1 part phosphoric acid is heated to boiling under a reflux condenser from one-half hour to six hours. The product will be more or less viscous at room temperature, depending on the time of refluxing and possess a characteristic odor which does not resemble the odor of tung oil. It contains a relatively small amount of the original phenol in free or uncombined condition, removable for instance by vacuum distillation.

To this phenol-oil composition I now add 100 parts by weight of 40% formaldehyde, 50 parts by weight of colophony and 3 parts by weight of aqueous ammonia and continue boiling under reflux for 5 hours. The reflux condenser is then removed and the water evaporated with efficient stirring. When the water is gone, the product becomes clear. Heating is continued at a temperature of 150° C. until the product is a clear non-tacky and tough solid when a sample is cooled to room temperature. The product is then dissolved in turpentine or toluene 300 parts by weight and when cooled is ready for use. If heating is continued before addition of solvents for a number of hours at 150° C. or above, the product will eventually gelatinize, becoming insoluble in the usual varnish solvents.

*Example 2.*—100 parts phenol, 50 parts rosin (colophony) and 150 parts tung oil are heated to boiling under a reflux condenser for one to ten hours. To this product are then added 100 parts 40% formaldehyde and three parts aqueous ammonia and boiling under reflux continued for 4 to 8 hours. The water is then removed by boiling with efficient stirring and the product heated and dissolved as described in the above example.

*Example 3.*—100 parts phenol, 180 parts tung oil, 20 parts linseed oil and 1 part phosphoric acid are heated to boiling under a reflux condenser for one to six hours. To the resulting product are then added 100 parts coumarone resin and 100 parts 40% formaldehyde and 5 parts aqueous ammonia, and refluxing continued 5 hours. The product is then dehydrated and the required consistency obtained by heating, and finally dissolved in solvents as in above examples.

*Example 4.*—100 parts phenol, 150 tung oil and 1 part boric acid are heated to boiling under a reflux condenser for one to six hours. To the resulting product are then added 25 parts rosin, 100 parts 40% formaldehyde and 3 parts aqueous ammonia and refluxing continued 5 hours. The product is then dehydrated, heated and dissolved as in above examples.

*Example 5.*—10 parts phenol, 100 parts tung oil and 1 part boric acid are heated together for one to six hours. To the resulting product are added 90 parts ester gum, 25 parts 40% formaldehyde and 3 parts aqueous ammonia and refluxing continued for 6 hours. The product is then dehydrated, heated and dissolved as in above examples.

*Example 6.*—400 parts tung oil, 250 parts cresol, 250 parts formaldehyde solution, 150 parts rosin, and 4 parts hexamethylenetetramine are refluxed for 5–8 hours to effect the condensation of the cresol-tung oil complex first formed. The product is then heated in the open and at increasing temperatures (100°–150° C.) until frothing ceases, indicating that the water has been eliminated. Then heat further at 150°–200° until the proper viscosity is attained, and dissolve in appropriate solvents.

One of the important characteristics of the products prepared as described above is that the product on heating passes through a stage where it is liquid while hot, but solid, tough and non-tacky when cold, being still soluble in turpentine or other solvents. When rosin or rosin-glycerine ester and tung oil are heated together the product does not pass through this stage, being either a soft sticky product, soluble in turpentine or a soft gelatinous product not completely soluble in turpentine. Before films of this latter type of varnish can become non-tacky or hard, a further change is necessary in the film which is brought about by oxidation of the oil. Even when the oxidation is accelerated by the use of metallic driers, as is customary, a period of several hours at least, is required to oxidize the film sufficiently to overcome the tackiness and produce a film which will not show marks when pressed with the finger tips. As compared to varnishes of this latter type, commonly known as spar varnishes, the present product becomes "dry to touch" exceedingly fast, the film being non-tacky as soon as the volatile solvents have evaporated, which requires only a few minutes. In other words, the varnishes of this invention do not depend on oxidation to make the film non-tacky, the resin oil composition itself being tough, elastic and non-tacky before the solvents are added and again as soon as the solvents are evaporated. Metallic driers are not necessary for this initial rapid drying, though I may use a small quantity of drier to accelerate the final hardening.

For certain types of coating or impregnating applications, as for instance, in the insulation of electrical apparatus or coils, it is sometimes desirable to use the product without any volatile solvent, in which case the article to be treated is immersed in the hot melted compound and then either air-dried or baked as desired.

In the foregoing examples I have mentioned tung oil by way of example, as the representative fatty oil to be combined with phenol or cresol in the preparation of the phenol-oil composition which is later to be condensed with the methylene groups. It is to be understood however that linseed, rape and other fatty oils or mixtures thereof may be substituted wholly or partly for the tung oil, with a corresponding change in the specific characteristics of the resulting product. For most purposes however the products prepared with tung oil are at present preferred.

As above pointed out, the proportion of non-phenolic resin relative to the phenol-oil-methylene resin may be widely varied, but a certain minimum proportion, amounting to about 20–25% by weight of the phenol, is essential for the proper performance of its function, which appears to be to act as a blending agent, and to prevent the reactive phenol-oil-methylene resin from becoming insoluble in the mixture as polymerization proceeds. In absence of the non-phenolic resin, the phenol-oil-methylene resin polymerizes rapidly and becomes insoluble or incompletely soluble in such solvents as are mentioned above; for which reason it becomes necessary to arrest the reaction at a comparatively early stage, for the preparation of the liquid varnish, and to complete the reaction by baking the varnish film. But in presence of sufficient non-phenolic resin suitably combined as herein described, the polymerization of the reactive phenol-oil methylene resin can be far advanced before the addition of the solvents, with the important result that the film is deposited directly, by mere evaporation of the solvents, in a hard and non-tacky condition.

In bringing about the reaction between phenol (oxybenzyl alcohol) and the fatty oil, I prefer to employ a converting agent of the nature of phosphoric or boric acid, as in Examples 1, 3, 4 and 5 above: however I have found that acid resins typified by rosin (colophony) and manila copal, when used in the proportions contemplated by this invention are capable of effecting this conversion, as illustrated in Examples 2 and 6. This procedure is particularly advantageous as applied to the reaction between the cresols and tung oil, suitable operating conditions being as disclosed in Example 6, although the invention is not restricted to these conditions.

I claim:

1. A resinous composition comprising a phenol-fatty oil-methylene reaction product in conjunction with a sufficient proportion of non-phenolic resin to function as a blending agent and to prevent the separation of insoluble reaction products.

2. A liquid coating composition comprising a phenol-fatty oil-methylene reaction product in conjunction with a sufficient proportion of non-phenolic resin to function as a blending agent and to prevent the separation of insoluble reaction products, and a suitable solvent therefor.

3. A resinous composition comprising a phenol-tung oil-methylene reaction product in conjunction with a sufficient proportion of non-phenolic resin to function as a blending agent and to prevent the separation of insoluble reaction products.

4. A liquid coating composition comprising a phenol-tung oil-methylene reaction product in conjunction with a sufficient proportion of non-phenolic resin to function as a blending agent and to prevent the separation of insoluble reaction products, and a suitable solvent therefor.

5. A resinous composition comprising a phenol-fatty oil-methylene reaction product in conjunction with a sufficient proportion of rosin to function as a blending agent and to prevent the separation of insoluble reaction products.

6. A liquid coating composition comprising a phenol-fatty oil-methylene reaction product in conjunction with a sufficient proportion of rosin to function as a blending agent and to prevent the separation of insoluble reaction products, and a suitable solvent therefor.

7. A resinous composition comprising a phenol-tung oil-methylene reaction product in conjunction with a sufficient proportion of rosin to function as a blending agent and to prevent the separation of insoluble reaction products.

8. A liquid coating composition comprising a phenol-tung oil-methylene reaction product in conjunction with a sufficient proportion of rosin to function as a blending agent and to prevent the separation of insoluble reaction products, and a suitable solvent therefor.

9. Process of making a resinous composition comprising effecting a reaction between a phenol and a fatty oil, and combining the resulting phenolic complex with a methylene-containing hardening agent and a non-phenolic resin, the latter in sufficient proportion to function as a blending agent and to prevent the separation of insoluble reaction products.

10. Process of making a resinous composition comprising effecting a reaction between a phenol and tung oil, and combining the resulting phenolic complex with a methylene-containing hardening agent and a non-phenolic resin, the latter in sufficient proportion to function as a blending agent and to prevent the separation of insoluble reaction products.

11. Process of making a resinous composition comprising effecting a reaction between a phenol and a fatty oil, and combining the resulting phenolic complex with a methylene-containing hardening agent and rosin, the latter in sufficient proportion to function as a blending agent and to prevent the separation of insoluble reaction products.

12. Process of making a resinous composition comprising effecting a reaction between a phenol and tung oil, and combining the resulting phenolic complex with a methylene-containing hardening agent and rosin, the latter in sufficient proportion to function as a blending agent and to prevent the separation of insoluble reaction products.

13. In a process of making a resinous composition, the step comprising effecting a reaction between a phenol and a fatty oil, in presence of an acid resin.

14. In a process of making a resinous composition, the step comprising effecting a reaction between cresol and tung oil in presence of an acid resin.

In testimony whereof, I affix my signature.

VICTOR H. TURKINGTON.